United States Patent
Stucki

(10) Patent No.: US 7,814,140 B2
(45) Date of Patent: Oct. 12, 2010

(54) METHOD OF MONITORING AND ADMINISTRATING DISTRIBUTED APPLICATIONS USING ACCESS LARGE INFORMATION CHECKING ENGINE (ALICE)

(75) Inventor: Daniel Stucki, Oberdiessbach (CH)

(73) Assignee: Unisys Corporation, Blue Bell, PA (US)

( * ) Notice: Subject to any disclaimer, the term of this patent is extended or adjusted under 35 U.S.C. 154(b) by 108 days.

(21) Appl. No.: 12/142,027

(22) Filed: Jun. 19, 2008

(65) Prior Publication Data

US 2009/0319597 A1 Dec. 24, 2009

(51) Int. Cl.
*G06F 15/16* (2006.01)
(52) U.S. Cl. .......................... 709/202; 709/227
(58) Field of Classification Search .......... 709/223–227
See application file for complete search history.

(56) References Cited

U.S. PATENT DOCUMENTS

| | | | |
|---|---|---|---|
| 6,785,726 B1 * | 8/2004 | Freeman et al. ............. | 709/227 |
| 6,826,606 B2 * | 11/2004 | Freeman et al. ............. | 709/223 |
| 6,922,724 B1 * | 7/2005 | Freeman et al. ............. | 709/223 |
| 2007/0083655 A1 * | 4/2007 | Pedersen ..................... | 709/226 |
| 2007/0244987 A1 * | 10/2007 | Pedersen et al. ............ | 709/217 |

* cited by examiner

*Primary Examiner*—Krisna Lim
(74) *Attorney, Agent, or Firm*—Richard J. Gregson

(57) ABSTRACT

A system, method, and machine readable medium for monitoring and administering a distributed application implementation is disclosed where an agent is associated with an application server. The agent monitors and collects information relating to all active distributed data sessions occurring on the application server and transmits the session information to a central data repository, for example, a database. The central data repository stores data session information relating to a plurality of application servers and may contain session information relating to application servers located in a plurality of server farms. A software application is provided that is capable of receiving input from a user related to the session data in the central data repository, querying the repository and returning a subset of session data relating to the user's input. Query results are displayed to the user allowing for administration of the distributed computing environment across multiple servers and server farms.

18 Claims, 7 Drawing Sheets

FIG. 2A

| FIG. 2A |
|---|
| FIG. 2B |
| FIG. 2C |

FIG. 2

Benutzer:
Stucki Daniel, IT-SDL-SEE-RSG        Alice (Access Large Information Checking Engine)
Sprache:    dfie swisscom
IT services

- ⊟ Home ServiceDesk
- ⊟ Verwaltung —— 201
  - ■ Benutzer suchen
  - ■ Computer suchen
  - ■ Lokaler Administrator
- ⊟ Citrix Portale
  - ■ Produktion SCIS
  - ■ Produktion TSS
  - ■ OPUS dritteProduktion
  - ■ OPUS RAS Produktion
  - ■ Produktion alt TSS
  - ■ OPUS dritte alt TSS
  - ■ OPUS RAS alt TSS
- ⊟ Connectors

111

[u121077] [suchen] —— 203
☑ Include Metaframe Data (Slow....)

Active Directory Information
Full Name      Ahmet Balkac (SCIS_User) —— 205
Description    Z IM-BW-MI-B+
Logon Name     U121077
State          Enabled
LDAP Path      sbb.ch/SBB/L/Division-Users/IM/U121077

Terminal Server Information [Reset] —— 207
Profile    \\filer25%vf%\cprof250\u121077\%OS-Version%
Drive      H:
Home       \\filer25\USERS250\u121077 22.54 MB of 50.00 MB

- Quick Restore Int
- Quick Restore Prod
- Quick Restore TSS

| Name | Client Name | Server Name | Session Name | Session ID | State |
|---|---|---|---|---|---|
| ☐ Memo | I20069 | ST13<3Z | ICA-tcp#579 | 46 | Active |
| ☐ Internet Explorer | I20069 | ST13<3Z | ICA-tcp#579 | 46 | Active |

Member in Gruppe:

DG_Prd-Citrix-CWI-Dispatch_A_Farm1
DG_Prd-Citrix-JP_Bizz-Access_A_01
DG_Prd-Citrix-JP_Default-Access_A_01
DG_Prd-Citrix-JP_Office_Access_A_01
DG_Prd-Citrix-JP_Standard_Access_A_01
DG_PRD-Citrix-PRF_filer25-cprof250_A_01
DG_TSS-Citrix_JP_Transplant_W2K_B_01
DG_TSS-Citrix_JP_Transplant_W2K3_A_01
Domain Users
G_F2246w
G_F2249w
G_F8403r
G-CI-AccessXP-L
G-CI-EXCEL-L
G-CI-EXCEL-R2-L
G-CI-GIS-VIEWER-L
G-CI-OPUS-BASIS-L
G-CI-OPUS-Basis-R2-L
G-CI-POWERPOINT-L
G-CI-PowerPoint-R2-L
G-CI-ProfileMigration-R2-Service
G-CI-WORD-l
G-CI-WORD-R2-L
O-SBB

*FIG. 2B*

Printer:

eDocPrinter PDF Pro
HN-BHF14-VERK-A4sw-DP-HPL12300D (from I31584) — 215
HP Business Inkjet 2300 PS (from I31584)
QTT4XXL1 (from I31584)
ZUE-AARG15-036-A4sw-LEXMT630 on I36038 (from I18561)
ZUE-HSE350-WR-A4sw-LEXMT642 on I36036 (from I18561)

| | Process | Server | ID |
|---|---|---|---|
| ← ◁ [ | iexplore.exe | ST1343Z | 20708 |
| ← ◁ [ | mcluser.exe | ST1343Z | 9796 |
| ← ◁ [ | memoclient.exe | ST1343Z | 18880 |

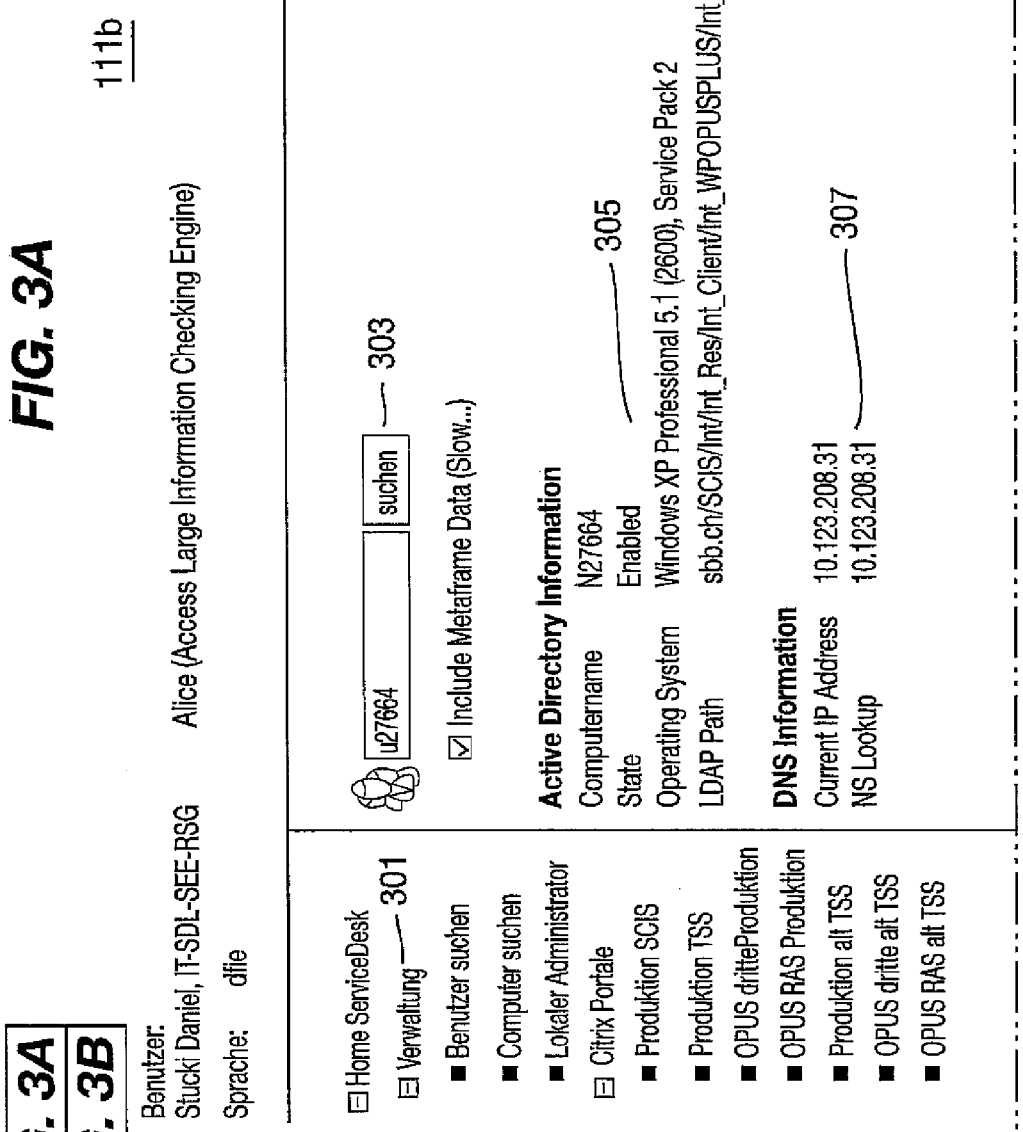

- Connectors
  - Quick Restore Int
  - Quick Restore Prod
  - Quick Restore TSS

309

| DisplayName | Name | State |
|---|---|---|
| Ac Profile Manager Service | AcPrfMgrSvc | Running |
| Access Connecting Main Service | AcSvc | Running |
| ACU Configuration Service | ACS | Running |
| Application Layer Gateway Service | ALG | Running |
| Automatische Updates | wuauserv | Running |
| COM+ Event System | EventSystem | Running |
| Computer Browser | Browser | Running |
| Cryptographic Services | CryptSvc | Running |
| DCOM Server Process Launcher | DcomLaunch | Running |
| DHCP Client | Dhcp | Running |
| DNS Client | Dnscache | Running |
| Event Log | Eventlog | Running |
| Help and Support | Helpsvc | Running |
| BMKCU Service | bkmpSvc | Running |
| IPSEC Services | PolicyAgent | Running |
| McAfee Framework Service | McAfeeFramework | Running |
| Net Logon | Netlogon | Running |
| Network Associates McShield | McShield | Running |
| Network Associates Task Manager | McTaskManager | Running |
| Network Connections | Netman | Running |
| Network Locations Awareness (NLA) | Nla | Running |
| OPUS LAN Detector | Detect Lan | Running |

*FIG. 3B*

METHOD OF MONITORING AND ADMINISTRATING DISTRIBUTED APPLICATIONS USING ACCESS LARGE INFORMATION CHECKING ENGINE (ALICE)

FIELD OF INVENTION

This invention relates to the field of information technology. More particularly, this invention relates to monitoring and administration of distributed application systems.

BACKGROUND

The use of computer technology has become commonplace in business today. Advances in technology allow workers to access information relating to their employment from almost anywhere. Telecommuting and personal communication devices with e-mail and other capabilities allow employees to be productive even when they are not physically at an employer location.

With these advances, however, come challenges. Electronic data such as databases and documents must be accessible. However, storing them locally on remote devices creates a situation where multiple versions of data exist that may affect the integrity and security of the information. Additionally, information belonging to the employer may be proprietary or subject to regulatory requirements such as the protection of private personal information. To maintain control over data, companies desire to have data stored on managed servers where there is a consistent version of the data, that is secured and backed up by the administrative and support staff.

One means of protecting company data is through the use of thin clients. A thin client is a communication protocol that allows a remote computer to communicate with a centralized server that houses data and applications available to the user of the remote computer. The thin client allows the user to see data in an application just as if the application were running on the user's local system, but all of the processing required by the application and the resulting data is performed and housed at the centralized server location. The data is therefore, subject to all security measures provided by the data owner. This provides protection in that no actual data, but only a graphical representation of the data or application is sent to the remote device. For example, if a sensitive document was created using a word processor on a notebook computer remotely connected to a centralized server, the document and all temporary files created by the word processing application are resident in the centralized server. No trace of the data is present in the notebook computer. If the notebook computer were to be lost or stolen, sensitive data could not be retrieved from the notebook computer because the sensitive data was never stored in any memory device within the notebook computer.

Thin client architectures also allow companies to leverage economies of scale. Because applications are centrally located and administered, there is no need to push software updates out to hundreds or thousands of workstations. A single update process can be done at the application server and the changes will be effective for all clients that log into the server subsequent to the update.

When the number of users accessing a central resource becomes large, the administration of the overall system becomes more complex. Large numbers of users require the implementation of multiple application servers. Application servers that are clustered to serve the data processing needs of an organization are called farms. Multiple servers that make up a farm will appear to users as a single computer name or IP address on the network, but may actually be a complicated network of servers. A server farm must be administered in a way that balances the processing loads of all users across the multiple servers as evenly as possible so that no individual server is overloaded.

Processing distributed applications relies on server farms. Hundreds of users may be accessing the server farm at any one time. Any problem occurring in the server farm may affect all the users connected to that farm. For example, a problem in one software application that causes a condition such as excess CPU consumption, may cause all applications being housed on the server to slow to unacceptable service levels. Similarly, a request by a user that causes an application to hang or take a long time to execute the request, such as a large search operation, could adversely affect all users connected to the server farm. For this reason, it is important for an administrator to be able to quickly identify the source of a problem and ensure that its effects on the community of users is minimized.

SUMMARY

A system, method, and machine readable medium for monitoring and administering a distributed application implementation is disclosed where an agent is associated with an application server.

The agent monitors and collects information relating to all active distributed data sessions occurring on the application server and transmits the session information to a central data repository, for example, a database. The central data repository stores data session information relating to a plurality of application servers and may contain session information relating to application servers located in a plurality of server farms.

A software application is provided that is capable of receiving input from a user related to the session data in the central data repository, querying the repository and returning a subset of session data relating to the user's input. Query results are displayed to the user allowing for administration of the distributed computing environment across multiple servers and server farms.

BRIEF DESCRIPTION OF THE DRAWINGS

FIG. 2A depicts a partial screen image using an embodiment of the present invention.

FIG. 2B depicts a partial screen image using an embodiment of the present invention.

FIG. 2C depicts a partial screen image using an embodiment of the present invention.

FIG. 3A depicts a partial screen image using an embodiment of the present invention.

FIG. 3B depicts a partial screen image using an embodiment of the present invention.

DETAILED DESCRIPTION

To manage distributed applications across an enterprise, application servers are configured that allow multiple users to access available applications housed on the application servers. Having users access the application through a network on an application server ensures that proper licensing for applications is maintained and that processing of data is done on servers that are resident within the enterprise and on machines that are managed for security and integrity by the enterprise. When the number of users requiring access to the applications becomes large, it is necessary to provide application resources utilizing multiple application servers. To the user, the fact that multiple servers are available wherein each provides access to a given application is unimportant. The user simply initiates a request to access a given application, identifies himself to the system, the user is validated, and the application is provided to the user from an application server the system deems best, as determined by administrative parameters established by the enterprise.

Figure 1:
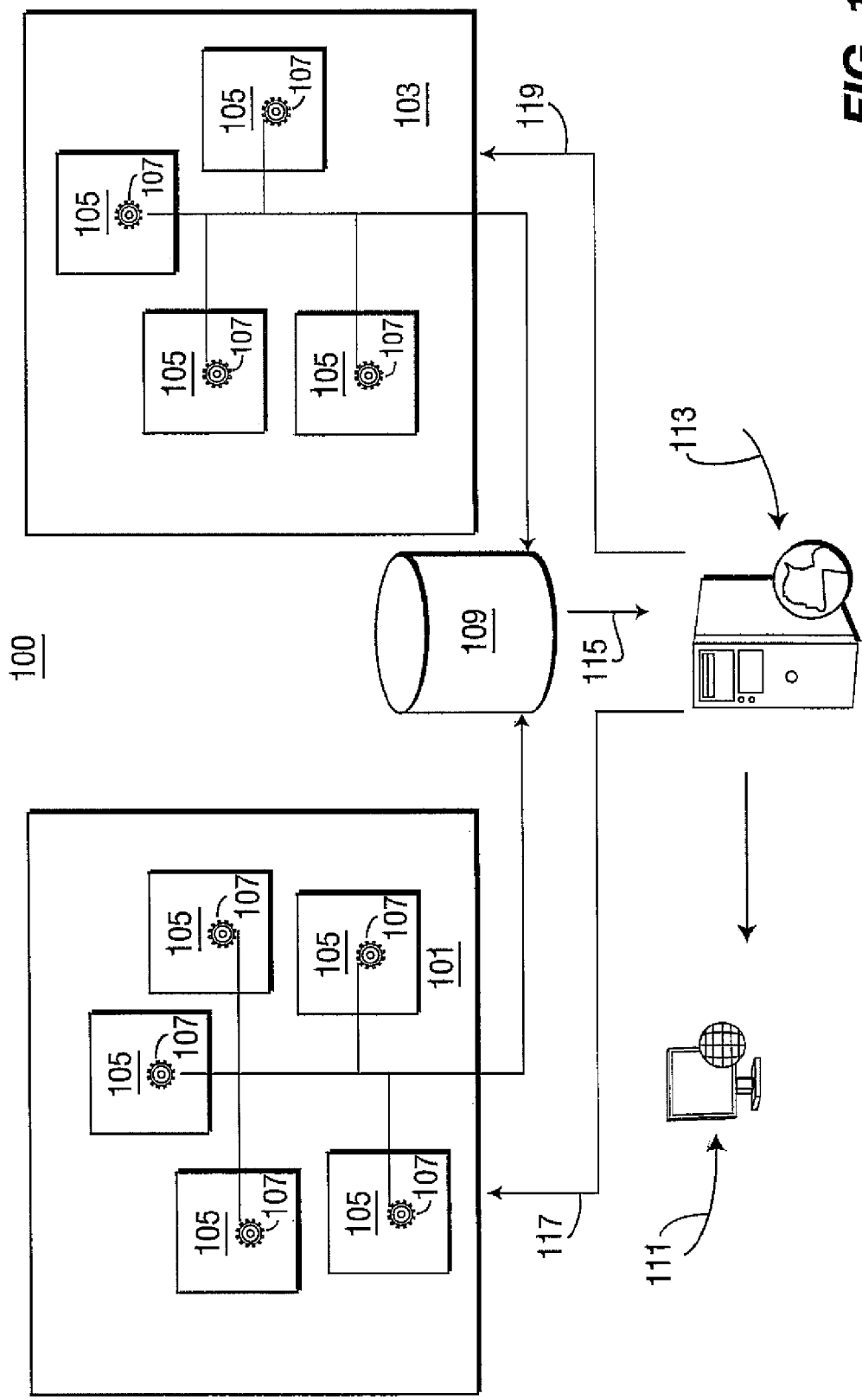
FIG. 1 is a block depicting an overview of the present invention.

Referring to FIG. 1, a system 100 comprises a plurality of application servers 105 logically associated with a server farm 101, 103. The server farm 101, 103 appears as a single computer name or IP address when services are requested from any of the servers 105 in the farm 101, 103. Prior art administrative tools are available for administering a server farm 101, 103, but only one farm may be administered at a time. Services 107 are run at each server 105 that is to be monitored. The service 107 is a computer process preferably implemented in software that runs on the server 105. The process serves as an agent to monitor remote computing sessions occurring on the server being monitored. The services 107 collect all information regarding application sessions on that server 105 and transmit them to a central repository such as a database 109. Applications servers 105 arranged within the first server farm 101 and the second server farm 103 are running services 107 and transmitting application session data to the same central repository 109. While two server farms are described in this embodiment, it is possible that any number of server farms could be monitored. All necessary information for administering multiple server farms 101, 103 are contained within the single repository 109. A web server 113 houses applications configured to query the common data repository 109 and to format and display the requested information at display 111. When information regarding any application session across a multitude of server farms 101, 103 is needed, the central repository 109 is queried using information supplied by the user. Information may be displayed through a web browser interface 111, but other query and display methods may be used. Retrieved information 115 allows an administrator to troubleshoot a specific user, or a specific station or server where a problem may be occurring. All session information for a user or station is displayed together in the web browser interface 111 allowing an administrator access to quick and comprehensive information that includes information originating from multiple server farms 101, 103. While in this embodiment, a web browser interface 111, is described, one skilled in the art will recognize that other interfaces could be used to present information queried from the central repository 109 all of which would be within the scope of the current invention.

FIGS. 2A, 2B and 2C combine to provide an example of a web browser interface 111 displaying information concerning a particular user that was searched by the administrator. All information displayed by the web browser interface 111 was retrieved from the central repository 109 then organized and formatted to be displayed as a browser-based visual output. When an administrator logs in, a hierarchical menu 201 is displayed allowing the administrator to quickly navigate to a number of administrative tasks. The menu option selected from the hierarchical menu 201 will determine the information displayed in the right frame portion of the screen 203-219. In the example of FIG. 2, information pertaining to a user search is depicted. The administrator enters data that identifies a user in a designated search box 203. The active directory services (ADS) are searched to locate the users information. Additionally, the distributed computing software, for example, Citrix® Presentation Server™, may be searched to determine if the user being searched 203 has any open sessions. The search user identification 203 is used to query the central depository 109 for all active information concerning the searched user 203. The basic ADS profile information relating to the searched user 203 may be displayed 205. Information relating to the user's 203 profile information on the terminal server 207 may also be displayed. Current session information is preferably displayed in a tabular format 211 where all pertinent information is displayed. The name of the application, the client station id, the server on which the application is running, a session ID and current state may be displayed 211. To aid in troubleshooting and administering the distributed application sessions, a particular application or group of applications may be selected and an option to logoff the user 203 or disconnect the session is provided 209. Information related to the user groups of which the searched user 203 is a member is displayed 213. Along with this user information, other administrative information such as the printers that are available to the user 203 may be displayed 215. Applications that are active and were opened by the searched user 203 are listed in their entirety. That is, all applications open on all servers across all server farms are preferably listed in one place including the executable file name, the server providing the application, and the process id 217. An individual process may be terminated by the administrator by clicking on a disconnect option 219. By clicking a disconnect option 209 or 219, change data is transferred to the application servers 105 via the server farms 101, 103 as depicted in FIGS. 1, 117 and 119.

The central data repository 109 is kept up-to-date with current session information by periodically re-transmitting session data from each server 105 via the service 107 to the central data repository 109. A configurable interval time may be set to automatically update the central data repository 109 on a regular basis.

FIGS. 3A and 3B similarly depict an example of information obtainable when a client id is searched. Information relating to the client station is retrieved from the central data repository 109. In the navigational menu 301 the computer search option is selected. Information pertaining to the identified client 303 is displayed as depicted in FIG. 3. The ADS information regarding the searched client 303 is displayed 305. The DNS entry information for the client is also displayed 307 along with an indication of whether the client is reachable by means of IP through the network. For instance, the DNS information 307 may be displayed in green text if the client is reachable by IP through the network, or it may be displayed in red text to denote the client is disabled or otherwise unreachable by IP through the network.

Figure 4:
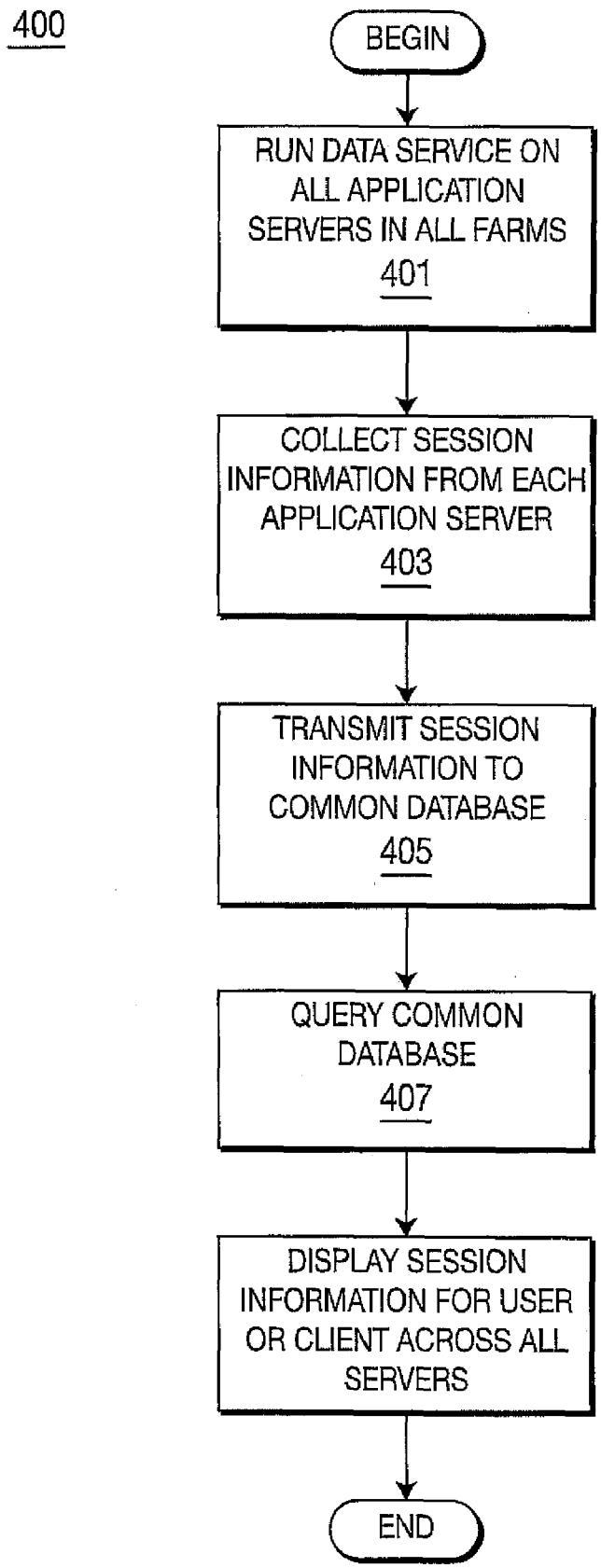
FIG. 4 is a flow diagram depicting method of the present invention.

In FIG. 4, a method 400 for administering application servers organized into a plurality of server farms is shown. A service is run on each application server to be monitored independent of which domain or server farm in which the server is located as indicated in step 401. The service collects information from all of its user sessions as indicated in step 403. The service reads out session information from a complete farm, the sessions dedicated by a server, or the sessions of the server on which the service is running. Session information may be read from the monitored server or servers at a configurable, pre-determined time interval. Next the service transmits the session information collected in 403 and transmits the session information to a central repository such as a database as indicated in step 405. The central repository contains all of the session information of all the servers on which the service is run. In step 407, the central repository is queried to extract the desired information. The structure of the query and the data that is returned as a result of the query may vary based on the needs of the administrator carrying out the query. Different queries may be executed, thereby resulting in different results based on the needs of the administrator which are determined through a troubleshooting process driven by the observed problem or operating conditions. In step 409, the results of the query are displayed to the administrator in a comprehensive and coherent display of data containing all of the pertinent session information including information collected across a multitude of server farms, where the process ends.

It is noted that the present invention may be implemented in a variety of systems and that the various techniques described herein may be implemented in hardware or software, or a combination of both. Although the features and elements of the present invention are described in the preferred embodiments in particular combinations, each feature or element can be used alone (without the other features and elements of the preferred embodiments) or in various combinations with or without other features and elements of the present invention. While specific embodiments of the present invention have been shown and described, many modifications and variations could be made by one skilled in the art without departing from the scope of the invention. The above description serves to illustrate and not limit the particular invention in any way.

What is claimed is:

1. A system of monitoring and administering distributed applications comprising:
    an agent associated with an application server configured to collect and transmit session information relating to distributed application sessions active on the application server;
    a central data repository capable of storing the session information, wherein the agent transmits the session information to the central data repository;
    a workstation configured to accept an input from a user and query the central data repository based on the input;
    the workstation further configured to extract a subset of the session information stored in the central data repository and format the subset of the session information for display; and
    a display capable of displaying the formatted subset of the session information;
    wherein the central data repository is kept up-to-date with current session information by periodically re-transmitting session data from each application server via the agent to the central data repository.

2. The system of claim 1 wherein the agent is associated with a plurality of application servers.

3. The system of claim 2 wherein the plurality of application servers are arranged into a plurality of server farms.

4. The system of claim 2 wherein the plurality of application servers are CITRIX® METAFRAME™ servers.

5. The system of claim 1 wherein the workstation is a web server.

6. The system of claim 1 wherein the display is a web browser interface.

7. The system of claim 1 wherein the input is related to a user.

8. The system of claim 1 wherein the input is related to a client.

9. The system of claim 1 further comprising a control integrated with the formatted subset of the session information, wherein the control terminates an associated data session when activated by the user.

10. A method of monitoring and administering distributed applications comprising the steps of:
    collecting from an application server all session information relating to an active session on the application server;
    transmitting the session information to a central data depository;
    accessing the session information stored in the central data depository based on criteria specified by a user;
    extracting a subset of the session information relating to the criteria specified by the user;
    formatting the subset of the session information relating to the criteria specified by the user; and
    displaying the subset of the session information relating to the criteria specified by the user;
    wherein the central data repository is kept up-to-date with current session information by periodically re-transmitting session data from each application server to the central data repository.

11. The method of claim 10, wherein the collecting step is done for a plurality of application servers.

12. The method of claim 11, wherein the plurality of application servers are arranged into a plurality of server farms.

13. The method of claim 10 wherein the application server is a CITRIX® METAFRAME™ server.

14. The method of claim 10 wherein the accessing, extracting, formatting and displaying steps are performed by a web server.

15. The method of claim 14 wherein the displaying is done through a web browser interface.

16. The method of claim 10, wherein the criteria is related to a user.

17. The method of claim 10, wherein the criteria is related to a client.

18. The method of claim 10 further comprising the step of controlling an active data session, wherein the active data session is disconnected by a control integrated into a display of the subset of the session information relating to the criteria specified by the user.

* * * * *